(12) United States Patent
Loui et al.

(10) Patent No.: US 10,192,117 B2
(45) Date of Patent: Jan. 29, 2019

(54) GRAPH-BASED FRAMEWORK FOR VIDEO OBJECT SEGMENTATION AND EXTRACTION IN FEATURE SPACE

(71) Applicant: Kodak Alaris Inc., Rochester, NY (US)

(72) Inventors: Alexander C. Loui, Rochester, NY (US); Lei Fan, Rockester, NY (US)

(73) Assignee: KODAK ALARIS INC., Rochester, NY (US)

( * ) Notice: Subject to any disclaimer, the term of this patent is extended or adjusted under 35 U.S.C. 154(b) by 56 days.

(21) Appl. No.: 15/167,327

(22) Filed: May 27, 2016

(65) Prior Publication Data

US 2016/0379055 A1    Dec. 29, 2016

Related U.S. Application Data

(60) Provisional application No. 62/184,605, filed on Jun. 25, 2015.

(51) Int. Cl.
G06K 9/00 (2006.01)
G06K 9/62 (2006.01)

(52) U.S. Cl.
CPC ..... *G06K 9/00718* (2013.01); *G06K 9/00744* (2013.01); *G06K 9/00765* (2013.01);
(Continued)

(58) Field of Classification Search
CPC ... G06T 7/0012; G06T 7/0014; G06T 7/0016; G06T 7/10; G06T 7/11; G06T 7/162; G06T 7/174; G06T 7/20; G06T 7/215; G06T 7/223; G06T 7/231; G06T 7/246; G06T 7/251; G06T 7/75; G06T 2207/10004; G06T 2207/10016; G06T 2207/10021; G06T 2207/10024; G06T 2207/10028; G06T 2207/10032; G06T 2207/10036; G06T 2207/10064–2207/10136; G06T 2207/20072–2207/20084;
(Continued)

(56) References Cited

U.S. PATENT DOCUMENTS 6,751,354 B2 * 6/2004 Foote ................. G06K 9/00758
348/395.1
6,859,554 B2 * 2/2005 Porikli ..................... G06T 7/11
375/E7.081

(Continued)

*Primary Examiner* — Jose L Couso
(74) *Attorney, Agent, or Firm* — Hogan Lovells US LLP

(57) ABSTRACT

A method for graph-based spatiotemporal video segmentation and automatic target object extraction in high-dimensional feature space includes using a processor to automatically analyze an entire volumetric video sequence; using the processor to construct a high-dimensional feature space that includes color, motion, time, and location information so that pixels in the entire volumetric video sequence are reorganized according to their unique and distinguishable feature vectors; using the processor to create a graph model that fuses the appearance, spatial, and temporal information of all pixels of the video sequence in the high-dimensional feature space; and using the processor to group pixels in the graph model that are inherently similar and assign the same labels to them to form semantic spatiotemporal key segments.

5 Claims, 5 Drawing Sheets
(5 of 5 Drawing Sheet(s) Filed in Color)

(52) U.S. Cl.
CPC .......... *G06K 9/6212* (2013.01); *G06K 9/6215* (2013.01); *G06K 9/6276* (2013.01)

(58) Field of Classification Search
CPC ............ G06T 2207/30004–2207/30148; G06T 2207/30212; G06T 2207/30221; G06T 2207/30232; G06K 9/00201; G06K 9/00221; G06K 9/00234; G06K 9/00335; G06K 9/00362; G06K 9/00523–9/00563; G06K 9/00624; G06K 9/00664; G06K 9/00711–9/00791; G06K 9/00805; G06K 9/3241; G06K 9/34; G06K 9/46; G06K 9/4652; G06K 9/4671; G06K 9/50; G06K 9/52; G06K 9/62–9/6298; G06K 2009/00738; G06K 2009/4657; G06F 17/3082; G06F 17/30017–17/30023; G06F 17/301–17/30109; G06F 17/30277; G06F 17/30309; G06F 17/30321–17/30336; G06F 17/30386; G06F 17/30424; G06F 17/30442; G06F 17/30477; G06F 17/30551–17/30554; G06F 17/30634; G06F 17/30657; G06F 17/30675; G06F 17/30781–17/30858; G06F 17/30247; G06F 17/30256; G06F 17/30268; G06F 17/3028; G06F 17/30312; H04N 21/232; H04N 21/23418; H04N 21/44008; G11B 27/031; G11B 27/036; G11B 27/34; A63B 2024/0025

See application file for complete search history.

(56) References Cited

U.S. PATENT DOCUMENTS

| | | | |
|---|---|---|---|
| 7,949,050 B2* | 5/2011 | Xu | G06K 9/00765 348/700 |
| 2003/0118214 A1* | 6/2003 | Porikli | G06K 9/00234 382/107 |
| 2013/0113877 A1* | 5/2013 | Sukthankar | G06K 9/00718 348/42 |
| 2017/0103264 A1* | 4/2017 | Javan Roshtkhari | G06K 9/00718 |

* cited by examiner

Dataset: Fox and Penguine

Dataset: Parachute and Red Bird

GRAPH-BASED FRAMEWORK FOR VIDEO OBJECT SEGMENTATION AND EXTRACTION IN FEATURE SPACE

RELATED APPLICATIONS

This application claims priority to U.S. Provisional Application No. 62/184,605, filed on Jun. 25, 2015, the content of which is herein incorporated by reference in its entirety.

FIELD OF THE INVENTION

The present invention relates to a video processing method and more particularly to a graph-based framework for video object segmentation and extraction for use in organizing, summarizing, and repurposing consumer videos.

BACKGROUND OF THE INVENTION

With the rapid development and lower cost of smartphones and new digital capture devices, consumer videos are becoming ever popular as is evident by the large volume of YouTube video upload, as well as video viewing in the Facebook social network. These large amounts of videos also pose a challenge for organizing and retrieving videos for the consumers. From an information perspective, the video content and metadata could be associated with higher level semantic information such as objects, scenes, activities, events, locations, people, themes, etc. Therefore, segmenting and extracting content information are an important capability for indexing and organizing the large amount of video data. Object level segments in a video sequence are semantically meaningful spatiotemporal units such as moving persons, static tree with waving leaves, flowing river, etc. Different from two dimensional image segmentation, the segmented semantic key-segments have to maintain both visual and motion coherence. Furthermore, a consumer video may only target a single moving object of interest in a dynamic cluttered background that a binary segmentation would be more desirable regarding consumer needs.

In general, video segmentation techniques can be grouped into three categories: 1) Spatial-first segmentation; 2) Temporal-first segmentation; and 3) Joint spatiotemporal segmentation. The first method is the most intuitive approach, as it directly inherits the methods used for static image segmentation. Methods from this category first focus on frame by frame color/motion segmentation and are followed by region matching techniques between successive frames to maintain a certain degree of visual continuity. The second category may also be called 'trajectory grouping' video segmentation. It starts from tracking discrete feature points to the extraction of their trajectories from all frames. Then, those trajectories belonging to the same moving objects are spatially grouped using individual appearance features. Compared to the previous method which only considers short-term motion between every pair of frames, this category focuses on long-term motion consistency from multiple successive frames. In contrast to the previous two categories, the third category 'Joint spatiotemporal segmentation' processes all frames together as a spatiotemporal volume in which an object is a three dimensional tube in which all pixels in it have both location and feature coherence. It defines the grouping criterion in both spatial and temporal domains so as to avoid the spatial/temporal correspondence matching step for the methods in the first two categories.

Segmentation of a video sequence into a number of component regions would benefit many higher level vision based applications such as video content retrieval, summarization, and repurposing of video content. However, single target object extraction would be a more demanding task considering a consumer's needs. In many cases, a consumer video sequence simply targets at capturing a single object's movement in a specific environment such as dancing, skiing, running, etc. The multi-region video segmentation and target object extraction are two closely related and mutually beneficial tasks in video processing that can be improved when solved jointly by passing information from one to the other. In general, motion object detection and extraction for a static video camera is relatively straightforward since the background barely changes and a simple frame differencing would be able to extract a moving foreground object. For a more cluttered background with waving trees or pedestrians passing by, a pixelwise background model, such as a Gaussian model or a Bayesian model can learn from old frames and classify pixels as either background or target motion object accordingly. With the growing emergence of portable camera platforms, a larger percentage of video contents are produced by hand held cameras which are no longer strictly static. Research into relaxing this assumption includes camera motion compensation so that pixelwise model from the previous frame can be adjusted with a homography or a 2D affine transform to maintain its accuracy. However, those methods assume the background can be approximated as a plane or the camera motion only includes pan, tilt, or zoom.

SUMMARY OF THE INVENTION

Video segmentation is the task of grouping pixels in successive video frames into perceptually coherent regions. It is a preliminary step to solve higher level problems such as automated surveillance, motion recognition, object tracking, video indexing and retrieval. In the case of consumer videos that are being captured under unconstrained indoor or outdoor conditions, video segmentation is a useful tool for extracting relevant and interesting content from such video sequence for further analysis or repurposing of the visual content. Given an un-annotated video sequence captured by either a static or hand-held camera, the graph-based method of the present invention first effectively models the data in a high dimensional feature space, which emphasizes the correlation between similar pixels while reducing the inter-class connectivity between different objects. The graph model fuses appearance, spatial, and temporal information to break a volumetric video sequence into semantic spatiotemporal key-segments. By further grouping the key-segments, a binary segmentation is able to extract a moving object of interest from a video sequence based on its unique and distinguishable regional properties. Experimental results show the robustness of the method of the present invention, which has achieved comparable or better performance when compared to several unsupervised methods.

The method of the present invention takes full advantage of the mutually beneficial relationship between video segmentation and motion object extraction to automatically discover a set of key segments for the modeling of a moving object in a static or hand-held video camera. The method of the present invention first models the video volume in a high dimensional spatiotemporal feature space, where pixels belong to the same object are closer to each other. Based on this, a bottom-up graph based method is used to find semantic key segments in a video sequence and those segments are further explored as a selective search for finding the target motion object.

BRIEF DESCRIPTION OF THE DRAWINGS

The patent or application file contains at least one drawing executed in color.

Copies of this patent or patent application publication with color drawing(s) will be provided by the Office upon request and payment of the necessary fee.

Figure 1:
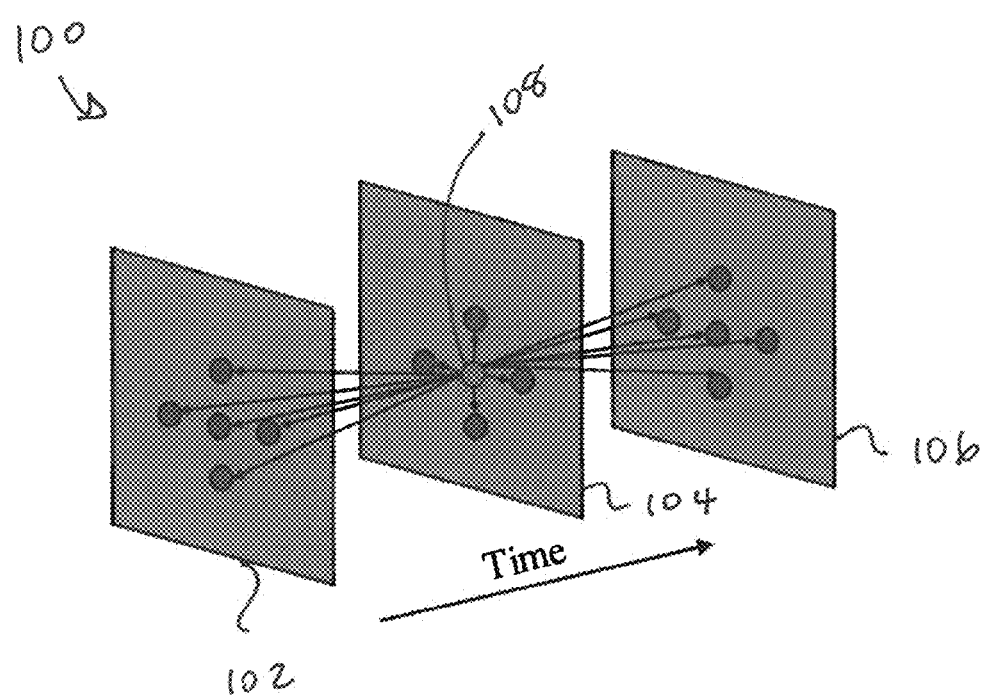
Figure 2:
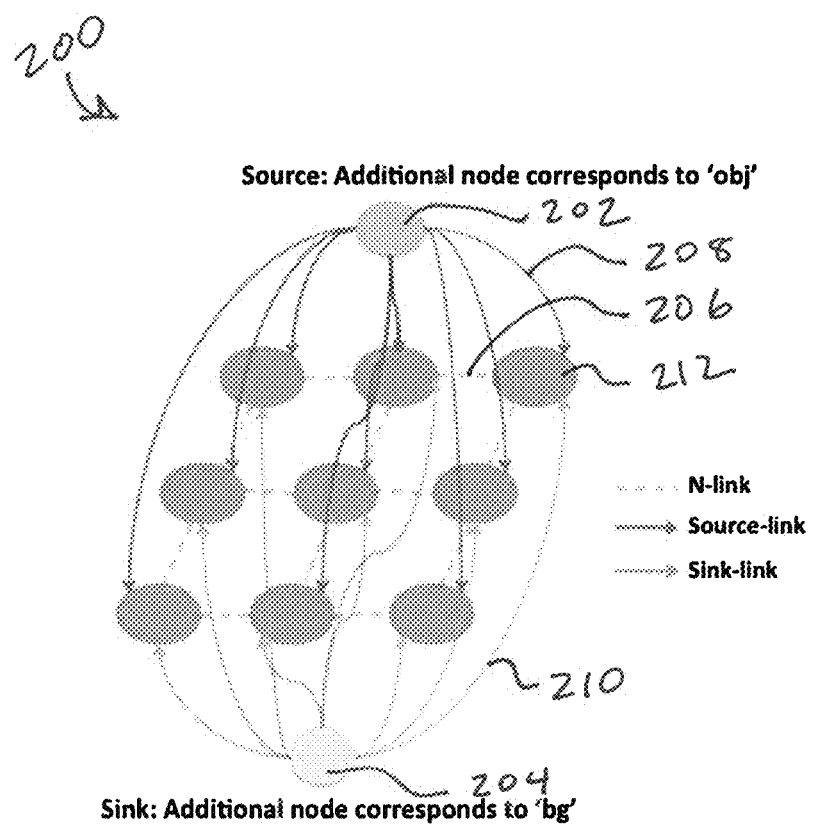
Figure 3:
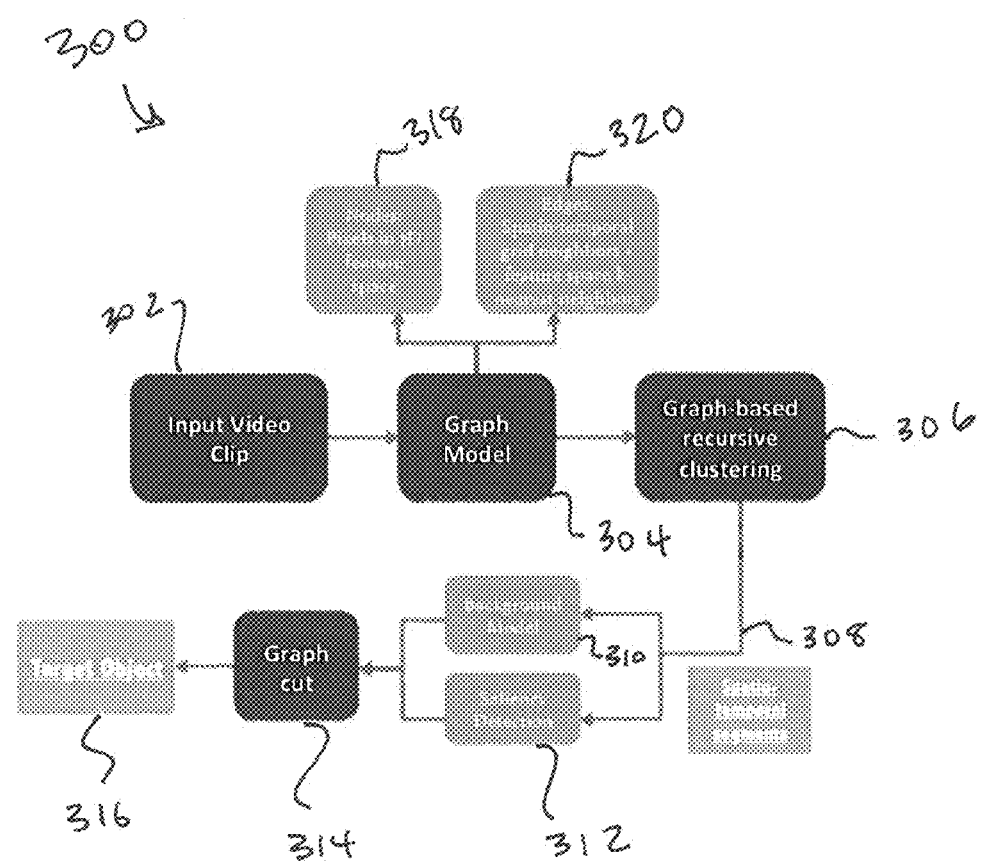
Figure 4:
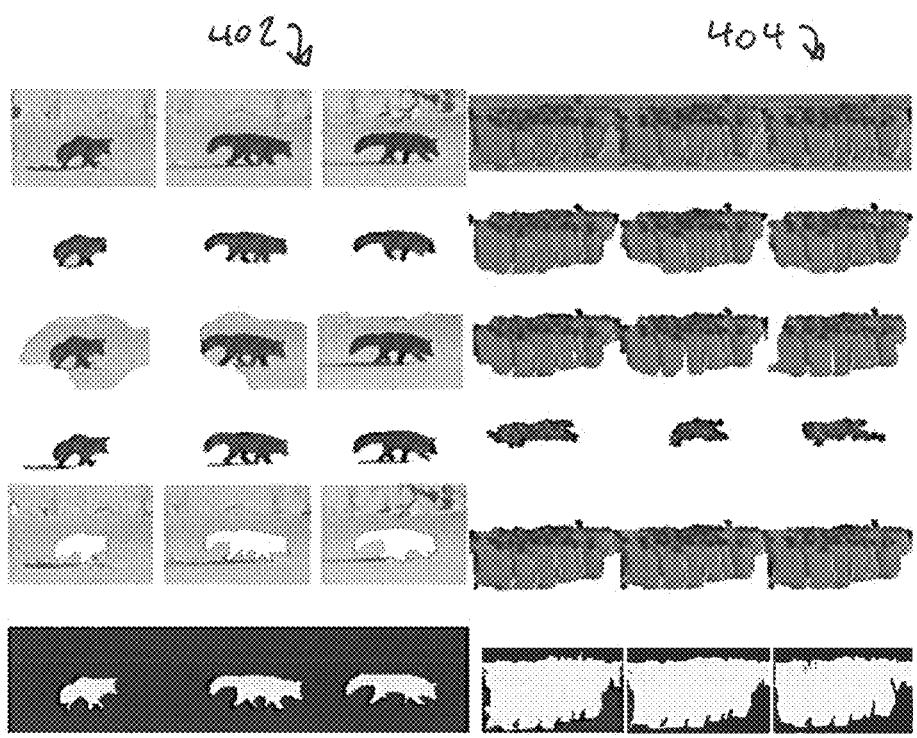
Figure 4:
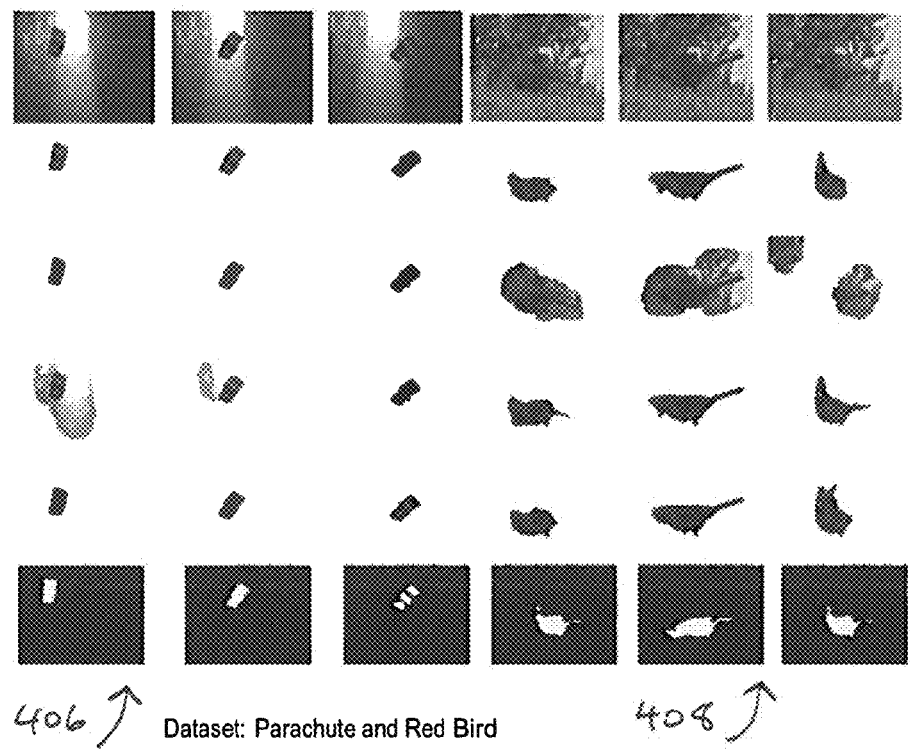

These and/or other aspects and advantages will become apparent and more readily appreciated from the following description of the example embodiments, taken in conjunction with the accompanying drawings of which:

FIG. 1. illustrates a node and its neighbors in a video-graph model, wherein a center node has fourteen edges incident to it by five nodes in the previous frame, four nodes from current frame and five nodes in next frame;

FIG. 2. illustrates a graph cut model, wherein other than source and sink nodes, each node represents a volumetric key-segment and the links in between reflect their regional similarities including motion, color and spatiotemporal location between end-points, wherein the source node stands for the virtual target object model learned in previous step, and the sink node stands for the virtual background model, and wherein the edges between the sink/source node to all other nodes reflect the likelihood each individual node belongs to the background/foreground;

FIG. 3. illustrates a flowchart, which shows strategies of applying graph-based approach for segmentation and moving object extraction for a given video clip according to the method of the present invention;

FIG. 4. illustrates four examples of motion object extraction results, wherein from top to bottom are shown: original video frames;—Li et al. processed frames; Liu and Gleicher processed frames; RC+saliency cut processed frames; Lee et al. processed frames; and frames process using the method of the present invention; and FIG. 5. Illustrates an extracted target motion object shown in several frames for each test video sequence using the graph-based feature space approach according to the method of the present invention.

DETAILED DESCRIPTION

Finding video key-segments in feature space according to the method of the present invention is now described.

Given the full accessibility of consumer videos saved on various multimedia platforms and online cloud storages, the video sequence can be processed all at once instead of one frame at a time. As discussed before, independent frame by frame segmentation produces unstable segmentation results and requires an additional post-refinement step to achieve higher accuracy. The method of the present invention takes pixels from both past and future frames together to construct a graph model. Considering the objective of segmentation is to group pixels that are attributed to the same object in all frames and assign the same label to them, instead of building up a 3D grid structure graph model from the video volume directly, the method of the present invention constructs a 7D feature space that covers color, motion, time and location information so that pixels are reorganized according to their unique and distinguishable feature vectors in this high dimensional space.

Video graph representation according to the method of the present invention is now described.

The method of the present invention ensures both temporal and spatial connectedness of regions. The method of the present invention also introduces other properties of the graph structure such as stronger inter-cluster distinguishability by using 7D feature vectors; stronger intra-cluster connectivity, as well as the ability for handling spatial and temporal inconsistency due to sudden motion changes or occlusion.

To detect semantic key-segments in a video sequence, the first step is to create a video-graph representation wherein each pixel is considered as a graph node, and two pixels are connected by an edge based on certain similarity criteria. The method of the present invention embeds all pixel information including color, motion, and location into the graph, and uses this graph model to achieve the clustering task by grouping pixels belonging to the same object together and assigns the same label in the high dimensional feature domain.

To an extent, how well such a graph is constructed based on the pixels from all frames will decide the accuracy of the segmentation. In order to group similar pixels together, the method of the present invention semantically connects pixels with a weighted edge that describes how likely two pixels belong to the same object regardless of their spatial and temporal locations that appeared in the video sequence. On the other hand, even if two pixels are spatially or temporally related to each other they do not necessarily have to be connected in the feature space. Therefore, it is desirable to perform a pixels reorganization according to individual feature vectors.

To intuitively explain the graph model adopted in the method of the present invention, a brief overview of the Felzenszwalb-Huttenlocher ("FH") algorithm is described. A graph model is a common object of study for mathematical analysis. It is usually made up of 'vertices' or 'nodes' and lines called edges that connect them. The graph G=(V, E) constructed from static imagery is a simple undirected graph wherein the node set V is made up of pixels in the image. And the edge set E is usually constructed by connecting two nodes if they are spatial neighbors to each other. This notion can be easily extended to video sequence by including temporal coherence as a new dimension in the graph 100, as illustrated in FIG. 1. For example, the center node 108 in the middle has 14 edges incident to it by its 14 spatial-temporal neighbors, i.e., pixels from previous frame 102, current frame 104 and next frame 106. The number of neighbors could be tuned as either smaller or larger depending on the object texture, contrast to the environment, etc. In a common situation, relatively larger number of neighbors would result in higher segmentation accuracy since more pixels from the same object would be more likely to be grouped together. Meanwhile, this would also be more time consuming by introducing too many edges in the graph.

In the original FH algorithm, edge weights $\omega(e)$ are derived from its endpoints' normalized color difference. As a bottom up merging approach, pixels would be gradually grouped into clusters. The internal variation Int(C) of a cluster C is defined as the maximum edge weight $\omega(e)_{max}$ of its Minimum Spanning Tree (MST):

$$Int(C) = \max_{e \in MST(C)} w(e) + \tau(C)$$

τ (C) is a threshold function based on the size of the component. The external difference between two clusters C1, C2 is the minimum weight edge connecting them:

$$Dif(C_1, C_2) = \min_{e_i \in C_1, e_j \in C_2} w(e_i, e_j)$$

Initially, the video-graph has each pixel being its own unique cluster. The merging process starts by sorting all edges in non-decreasing order and evaluating whether the edge weight is smaller than the internal variation of both regions incident to it. If it is true, two regions would be merged and the internal variance get updated. Otherwise, the comparison would move to the next smallest edge weight.

Video segmentation in feature space is now described.

The above algorithm is extended to better group video pixels into semantic spatiotemporal key-segments regardless of individual spatial and temporal locations inconsistency due to sudden movement or occlusions by converting them into a high dimensional feature space. In the new space, pixels belonging to the same object would be located close to each other since they all share similar features such as color, motion, spatial location and temporal coherence. The method of the present invention locate every pixel in the new 7D feature space where the coordinates are Y-color channel, U-color channel, V-color channel, x location, y location, horizontal motion vector, and vertical motion vector. Every pixel should be preprocessed including color space conversion and optical flow calculation, in order to derive a feature vector so as to obtain its new unique coordinate in the 7D feature domain. Combination of all seven features guarantees coherence in both appearance and motion.

After the relocation of all pixels in the 7D feature space, instead of connecting every node to immediate neighbors in the original 3D spatiotemporal video volume, the method of the present invention uses a k nearest neighbor search in the feature domain to connect pixels that are inherently similar regardless of its spatial and temporal location in the original video sequence. Finding neighbors in the spatial domain may guarantee a smooth labeling, while finding neighbors in the feature domain will benefit grouping similar but spatially or temporally disconnected pixels together. This is especially helpful for handling the occlusion issue in a video sequence. The following simple example illustrates the idea: if there is a walking person occluded by a trunk in several frames in a video sequence, though our brain could naturally perceive it as the same person before and after the occlusion, the video-graph model is not smart enough to recognize this fact since those pixels are no longer connected before and after the occlusion frames if constructed in the original volumetric video tube. However, pixels belonging to the walking person should always stay close to each other in the feature domain since they share similar color and motion information. In this manner, our graph tends to better group pixels that are similar in nature but spatially disconnected so as to produce higher accuracy compared to simply connecting neighbors in original 3D video volume.

With the video-graph being constructed in the 7D feature space, weight per edge could simply be derived from the Euclidean distance between the endpoints since their location indicates their similarity. The 7D feature descriptors offer a much richer description of appearance and motion. With the novel video-graph model according to the present invention, the same segmentation algorithm can be applied to obtain volumetric key-segments in video sequences. The present invention also adopts a hierarchical implementation owing to the fact that the concept of semantic objects are perceived by an intelligent agent while the algorithm is only capable of recognizing lower level clusters. Using the output from previous hierarchy, higher level objects are progressively individuated with the combination of lower level clusters over time. After the first iteration, the nodes in the graph model become the clusters and the edges are directly inherited from the pixel level edges. The descriptors used for computing the weight for new cluster nodes are the color histogram and motion histogram calculated and evaluated in each channel. The hierarchy iteratively builds up until the predefined segments mutual dissimilarity threshold and key-segments size threshold are satisfied.

Region-based video motion object extraction according to the method of the present invention is now described.

As previously described, the method of the present invention to segment video sequences captured by a static or hand-held camera was introduced. This is achieved by constructing a video-graph model in a high-dimensional feature space such that pixels belong to the same object are relocated close to each other with higher connectivity while pixels from different objects have fewer connections. The method of the present invention is able to extract semantic object or sub-object level volumetric key-segments from a spatiotemporal video volume. Considering the fact that consumer videos usually target one or more moving objects, but due to the complex and dynamic scene environment, it is still a challenging task to automatically extract the target moving object from its surrounding objects.

A region-based graph model according to the present invention is now described.

The volumetric key-segments is a good set of initial entities to search for target moving objects. However, since the processing method is not provided with any prior knowledge on the target's appearance, shape or location information, the method needs to use a reasonable assumption/hypothesis to build an initial background model to describe how it is different from other objects or the background. The method first assumes that the background exhibits dominant motion and appearance across video frames. A Gaussian mixture model ("GMM") background subtraction algorithm creates a Gaussian mixture model for every pixel through iterative updates on its intensity in every new frame. The method of the present invention examines the labels assigned to one pixel in all frames after the segmentation stage. If the label distribution over all frames for one particular pixel location has a small variation that goes below a predefined confidence level, a background pixel is assumed. Besides pixel level background modeling, a typical grouping algorithm, such as K-Means to group those key-segments with their region level descriptors so that the largest grouped cluster is considered as the dominant background could be used.

Besides the assumption that background usually holds a dominant role, the observed saliency learned from labeled data of segmented objects or sub-objects allows inference of visual and motion cues for learning foreground and background models. To find the target object among all key-segments, the method of the present invention is looking for those most different in motion and appearance relative to the surroundings. The method of the present invention thereby generalizes the pixel level saliency score by expanding it to volumetric key-segments. Similar to region-node graph model clustering, key-segments are described with the combination of color and motion histogram in individual channels to resolve the visual and motion ambiguity due to cluttered surroundings and multiple motions introduced by camera motion and disparity. The method of the present invention first quantizes the color and motion histogram in each individual channel to 16 bins. Then the method computes the saliency value by measuring and combining the color and motion contrast to all other key-segments in the video volume:

$$S_x(C_k) = \sum_{k \neq i} D_x(C_k, C_i)$$

where $S_x(C_k)$ is the saliency score for one segment by calculating its contrast to all other segments in one color or motion channel $D_x$. The contrast was computed with the Bhattacharyya distance between corresponding histograms. In order to combine all motion and color histograms to derive a single saliency score:

$$S_x(C_k) = \prod_x \left(1 - \exp\left(-\frac{S_x(C_k)}{\delta_x}\right)\right)$$

$\delta_x$ is a scaling factor in one channel in either color or motion histograms that converts different information into the same unit for saliency score combination. It is chosen as the mean value among all saliency scores in that channel.

A moving object extraction framework according to the method of the present invention is now described.

Based on the above two assumptions, the method of the present invention creates an initial foreground object model and background model, which would be further refined for finding the target object. It is noted that these are the assumptions made for generic videos. However, many videos have cluttered backgrounds so it is hard to assume that color information is a very useful tool for distinguishing the interested target object. On the other hand, for those videos captured by a freely moving camera with high depth variations in the scene, there will exist motion disparities among the background clusters and make the motion cues less effective in this case. Hence the method of the present invention adopts penalizing factors for color and motion terms in the above equation depending on the content that could effectively emphasize on the dominant discriminating cues for successfully extraction of the target motion object in a video sequence.

Given the initial target and background model, target motion object could be extracted from all the detected key-segments with a graph cut algorithm. It is a widely used algorithm in object segmentation but it requires a prior foreground/background information. With the initial background/foreground model combined with the graph cut algorithm, the method of the present invention is able to further produce an optimized binary labeling for all spatiotemporal volumetric key-segments that effectively labels the target motion object.

The method of the present invention extends the graph cut algorithm to handle a region level volumetric segments labeling problem. Similarly, each segment obtained from the previous video segmentation stage represents a node. Edges between nodes reflect their mutual similarity considering both spatial and temporal coherence, which helps to maintain the smoothness in volumetric video tube. Instead of the usual grid structure used for 2D image plane, the method of the present invention connects volumetric segments to their spatiotemporal neighbors in the 3D video volume by a k nearest neighbor search, such that if two segments have pixels that are immediate neighbors in one frame or in two successive frames, they would be considered as neighbors in the volumetric video tube. In addition to the smoothness term, each segment is independently linked to the source and sink node so that edges between them reflect similarity to our initial target model and background model (see FIG. 2).

FIG. 2 illustrates a graph cut model 200, wherein other than the source 202 and sink 204 nodes, each node 212 represents a volumetric key-segment and the links in between reflect their regional similarities including motion, color and spatiotemporal location between end-points, wherein the source node 202 stands for the virtual target object model learned in previous step, and the sink node 204 stands for the virtual background model, and wherein the edges between the sink/source node to all other nodes reflect the likelihood each individual node belongs to the background/foreground. Also shown in FIG. 2 is the N-links 206 between the nodes, the source-links 208 associated with the source node 202, and the sink-links 210 associated with the sink node 204.

Once the region level graph model is created, the graph cut would find a good balance among all candidate key-segments by taking into consideration both the global visual and motion smoothness, as well as the local target/background similarity. The metrics used to assign value for the smoothness and data terms are region motion and color histograms.

$$E(s, n_j) = 1 - \exp(-s_{color}) * \exp(-S_{motion})$$

where $E(s, n_j)$ is the data term between source/sink and nodes using the color and motion histograms. The overall energy function is the combination of the data term and a smoothness term which is defined as:

$$\delta(l_i, i_j) = \begin{cases} 0 & \text{if } l_i = l_j \\ 1 & \text{if } l_i \neq l_j \end{cases}$$

$$B(n_i, n_j) = (1 - \exp(-S_{color}) * \exp(-S_{motion})) \cdot \delta(l_i, l_j)$$

The i and j in the $\delta$ function are two spatiotemporal neighbor segments. The boundary smoothness term above holds an important role in balancing the spatiotemporal smoothness between all regions and each region's individual similarity to the target object/background. By solving for the global energy function, a binary labeling will be derived and target motion object could be extracted from all other surroundings.

The graph-based approach for video target object extraction is summarized in the workflow diagram 300 of FIG. 3. The method of the present invention receives an input video clip 302, which is received by the graph model 304. Graph model 304 includes nodes 318, which are pixels in a 7D feature space, and edges 320, which are spatiotemporal grid neighbors and feature space k-nearest neighbors. A graph-based recursive clustering step 306 processes the output of the graph model. The graph-based recursive clustering step 306 provides spatiotemporal segments 308, which are received by a background model 310 and saliency detection block 312. The output of model 310 and block 312 are received by the graph cut processing step 314, which provides the output target object 316 according to an embodiment of the present invention.

Experimental results according to the method of the present invention are now described.

Evaluations of the feature space graph-based target object extraction approach according to the method of the present invention on a variety of videos from different datasets as well as a consumer video dataset. The results of using the method of the present invention are compared with the prior art results to visually evaluate performance. Four datasets 402, 404, 406, and 408 are shown in FIG. 4, each with results from various sources as was previously described. The segmentation of the method of the present invention successfully separates the motion object while providing sufficient details for each dataset. It is noted that the Fox video sequence was captured by a slow moving camera with changing background and has shadows following the target fox in the snow (dataset 402). The Penguin video sequence (dataset 404) contains multiple object instances as the target objects with low color contrast to the background and random individual motions. For the other two test video sequences, the Parachute video sequence (dataset 406) has low visual contrast and the Redbird video (dataset 408) contains articulated motion as well as cluttered and waving backgrounds. Discrimination of the foreground target objects in such challenging video sequences is difficult. The results of the method of the present invention are presented by masking the extracted target motion objects as white among an all-black background in the output video sequences as shown in FIG. 4. From the comparisons with other state-of-the-art approaches, the graph-based approach of the method of the present invention is shown to better extract the target object using a high dimensional graph model fused with multiple features and followed by an accurate region level labeling procedure.

Figure 5:
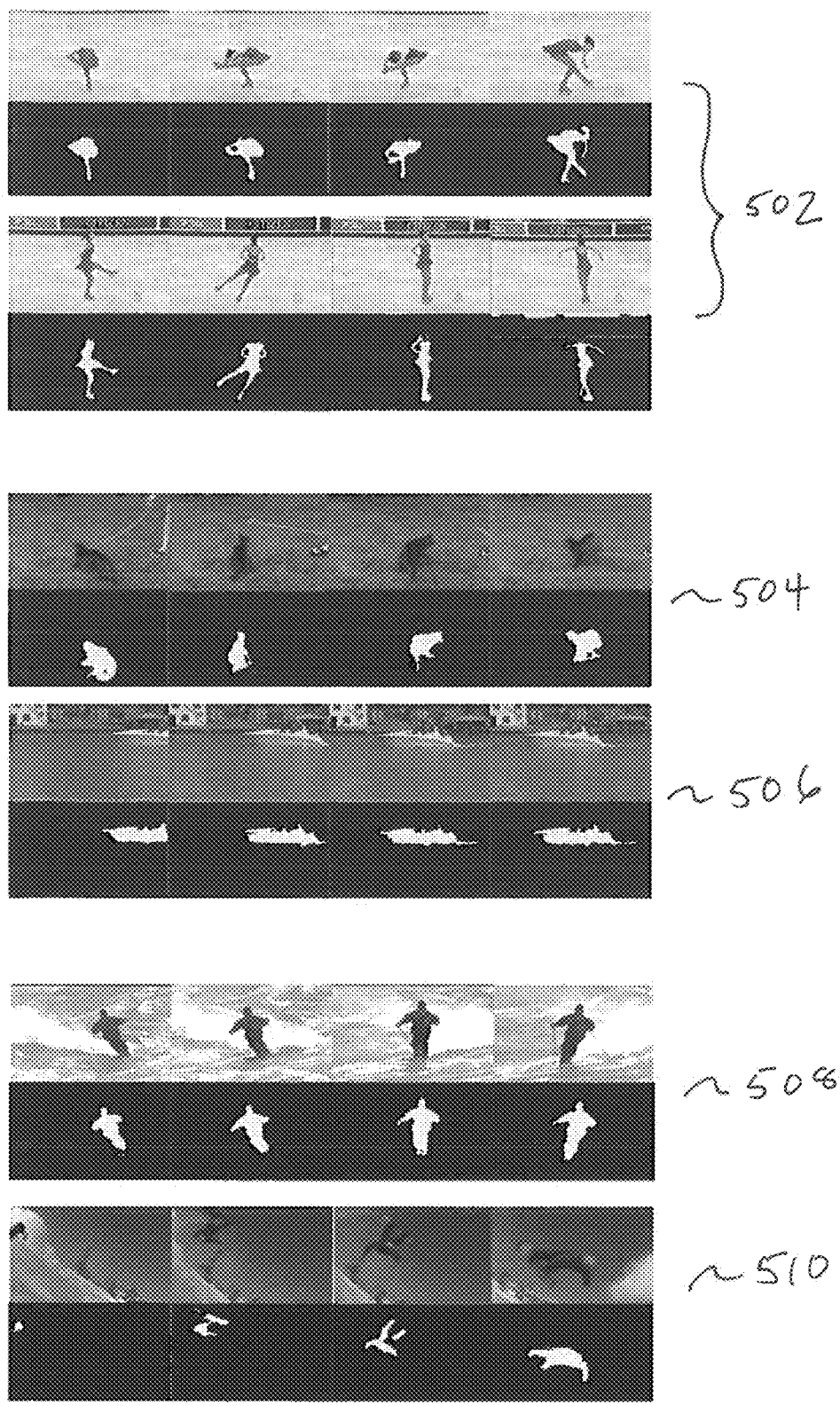

Results on other test videos including the Yu-Na Kim's ice-skating video (dataset 502) from the 2009 World Championships as well as consumer video datasets 504, 506, 508, and 510 are shown in FIG. 5. The method of the present invention has successfully segmented a given video sequence into semantic level key-segments and extracted the target motion object from the video sequence in a fully automatic fashion without any prior information provided. The performance can be visually evaluated as shown in FIG. 5 using the above-mentioned datasets. The results illustrate the advantage of the method of the present invention that pixels are effectively grouped together with high dimensional feature descriptors, and a fine binary segmentation is achieved through energy optimization by balancing the region cost and spatiotemporal connectedness.

In conclusion, a novel graph-based spatiotemporal video segmentation and automatic target object extraction method in high-dimensional feature space is described. Instead of constructing a 3D grid structure graph model from the volumetric video sequence directly, the method of the present invention embeds appearance, motion and location information all together into a high dimensional feature space, where pixels belonging to the same object are located close to each other in this new space. This method improves correct grouping and at the same time reduces the false connections between different regions. By running in a hierarchical fashion, the method of the present invention fuses both pixel-level and region-level visual, spatial, and temporal cues to produce smooth and semantic key-segments in the first stage. Based on the outputs from the first stage, the method of the present invention also successfully models an initial target and background models which are further combined with the graph-cut algorithm to automatically label the target object in a video sequence. Compared with several state-of-the-art unsupervised object extraction methods applied on multiple datasets, the method of the present invention is visually examined to be both robust and accurate. The method of the present invention demonstrates the ability to extract complete and smooth target motion objects from either cluttered, low visual contrast, or slowly changing background with no prior knowledge.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

We claim:

1. A method for graph-based spatiotemporal video segmentation and automatic target object extraction in high-dimensional feature space, comprising:
   a) automatically analyzing an entire volumetric video sequence;
   b) constructing a high-dimensional feature space that includes color, motion, time, and location information so that pixels in the entire volumetric video sequence are reorganized according to their unique and distinguishable feature vectors;
   c) creating a graph model that fuses appearance, spatial, and temporal information of all pixels of the video sequence in the high-dimensional feature space, wherein the graph model represents each pixel as a graph node, and two pixels are connected by an edge based on similarity criteria;
   d) grouping pixels in the graph model that are inherently similar and assign the same labels to them to form semantic spatiotemporal key segments; and
   e) using the semantic spatiotemporal key segments as an input to an initial background/foreground model combined with a graph cut algorithm to label at least one target object.

2. The method of claim 1 wherein the graph cut algorithm is used to analyze region level volumetric segments for each segment obtained from the previous video segmentation stage to create nodes and using edges between nodes to reflect their mutual similarity considering both spatial and temporal coherence.

3. The method of claim 1 wherein intra-cluster connectivity is used to correct spatial and temporal inconsistency due to sudden motion changes or occlusion.

4. The method of claim 1 wherein the high-dimensional feature space is a seven dimension feature space.

5. The method of claim 1 wherein a k-nearest neighbor search is used in step d) to group pixels that are inherently similar and assign the same labels to them.

* * * * *